(12) United States Patent
Jayaraj et al.

(10) Patent No.: US 9,042,833 B1
(45) Date of Patent: May 26, 2015

(54) INFRARED AND CAPACITANCE BASED SENSING FOR PROXIMITY DETECTION

(75) Inventors: Nagendra Bage Jayaraj, Sunnyvale, CA (US); Khaled Ahmad Obeidat, Santa Clara, CA (US); Marshall Williams, Fremont, CA (US); Michael M. Lee, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 587 days.

(21) Appl. No.: 13/333,576

(22) Filed: Dec. 21, 2011

(51) Int. Cl.
*H04B 5/00* (2006.01)
*H04B 1/02* (2006.01)
*G06F 3/033* (2013.01)
*H04B 1/38* (2006.01)

(52) U.S. Cl.
CPC ........................................ *H04B 1/38* (2013.01)

(58) Field of Classification Search
CPC ...................................................... G06F 3/033
USPC ........ 455/41.1, 41.2; 340/539.22, 12.51, 10.1
See application file for complete search history.

(56) References Cited

U.S. PATENT DOCUMENTS

| 3,898,472 | A * | 8/1975 | Long | 180/270 |
| 5,871,232 | A * | 2/1999 | White | 280/735 |
| 2001/0022551 | A1* | 9/2001 | Barnett | 340/442 |
| 2007/0027599 | A1* | 2/2007 | Sakai et al. | 701/49 |

* cited by examiner

*Primary Examiner* — Tilahun B Gesesse
(74) *Attorney, Agent, or Firm* — Lowenstein Sandler LLP

(57) ABSTRACT

A proximity detection module determines, using an infrared (IR) sensor of a user device, a distance between an object and the user device. The proximity detection module compares the distance to a distance threshold. If the distance is below the predefined distance threshold, the proximity detection module determines, using a capacitance sensor of the user device, a capacitance value associated with the object. The proximity detection module compares the capacitance value to a predefined presence threshold, and if the capacitance value meets or exceeds the predefined presence threshold, determines that the object comprises a body part of a user.

23 Claims, 9 Drawing Sheets

INFRARED AND CAPACITANCE BASED SENSING FOR PROXIMITY DETECTION

BACKGROUND OF THE INVENTION

A large and growing population of users enjoys entertainment through the consumption of media items, including electronic media, such as electronic books (also referred to herein as ebooks), electronic newspapers, electronic magazines, other electronic publications, audio books, and digital video. Users employ various electronic devices to consume such media items. Among these electronic devices are electronic book readers, cellular telephones, personal digital assistants (PDAs), portable media players, tablet computers, electronic pads, netbooks, desktop computers, notebook computers, and the like.

In various scenarios, it may be advantageous to detect when a user is in close proximity to an electronic device. For example, the electronic device may decrease the transmission power of a radio frequency antenna when the user is near the device to prevent the user from being exposed to excess radiation. In addition, certain specifications may require that the presence of a user be detected within a certain range of the device (e.g., ten millimeters). Conventional proximity sensing solutions may detect the presence of an object using capacitance sensing techniques. Depending on the sensitivity of the capacitance sensor and the distance that the object is from the electronic device, it may be difficult to distinguish between a user's body and some other conductive object (e.g., a metal table). For example, a large metal table at one distance may register the same capacitance value with the capacitance sensor as a human body at another distance. Without knowing the distance between an object and the electronic device, it may be difficult to determine whether the object is a user's body or some other object. This may result in the device decreasing the transmission power unnecessarily, possibly leading to decreased performance.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION OF THE PRESENT INVENTION

The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

Embodiments of a method and apparatus are described for detection of a user in proximity to a user device. In one embodiment, a proximity detection module determines, using an infrared (IR) distance sensor in the user device, a distance between an object and the user device. The proximity detection module compares the distance to a predefined distance threshold. If the distance is within the predefined distance threshold, the proximity detection module determines, using a capacitance sensor in the user device, a capacitance value of the object. The proximity detection module compares the capacitance value to a predefined presence threshold, and if the capacitance value meets the predefined presence threshold, determines that the object is a body part of a user, rather than some other object (e.g., a metal table).

Proximity detection based on both a distance measurement and a capacitance value may allow for a more accurate determination of when a user is in proximity to the device because the device may not confuse a non-human object (e.g., the metal table) with a body part of a user of the device. This may allow the device to reduce transmission power of an antenna only when a user is in close proximity to the device and maintain a current transmission power at all other times. This may lead to increased performance of the user device.

Figure 1:
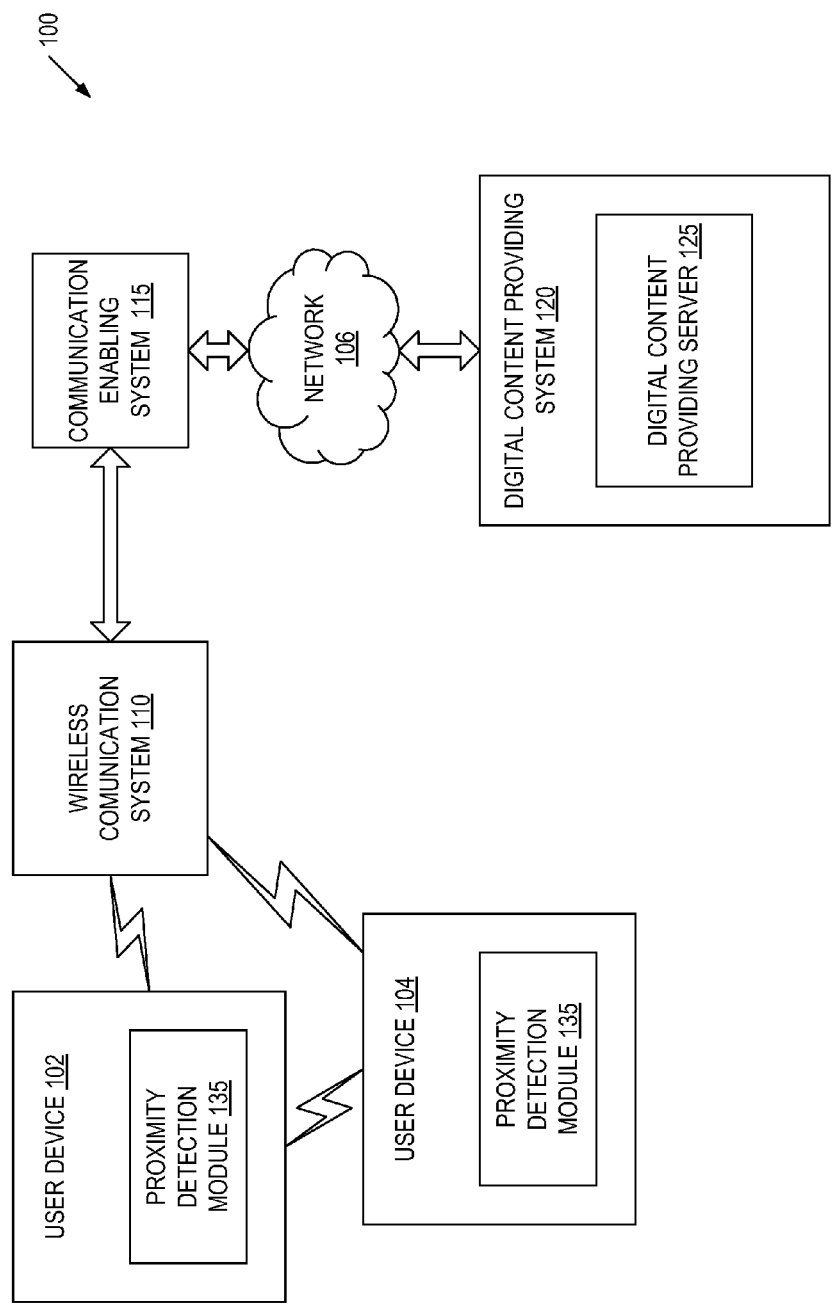
FIG. 1 is a block diagram of an exemplary network architecture, in which embodiments of the present invention may operate.

FIG. 1 is a block diagram of an exemplary network architecture 100, in which embodiments of the present invention described herein may operate. The network architecture 100 may include a digital content providing system 120 and one or more user devices 102, 104 capable of communicating with the digital content providing system 120 via a network 106. Network 106 may include, for example, a public network such as the Internet or a private network such as a local area network (LAN).

The user devices 102, 104 may be portable computing devices such as electronic book readers or tablet computers (e.g., that include a book reader application). Other examples of portable computing devices include cellular telephones, personal digital assistants (PDAs), portable media players, netbooks, and the like. The user devices 102, 104 may also be non-portable computing devices such as a desktop computer, a set-top box associated with a television, a gaming console, and so on. The user devices 102, 104 are variously configured with different features to enable consumption of one or more types of digital content and electronic media items. The digital content and electronic media items may include electronic books (ebooks) and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), and multimedia content.

The digital content providing system 120 may correspond to any feature or combination of features for providing electronic media items or other digital content to the user devices 102, 104. The digital content providing system 120 may include a network-accessible server-based functionality (digital content providing server 125), various data stores (not shown), and/or other data processing equipment. The digital content providing system 120 may be implemented by a single machine or a cluster of machines. The digital content providing system 120 may include one or more machines (e.g., one or more server computer systems, routers, gateways, etc.) that have processing and storage capabilities to provide the server-based functionality.

In one embodiment, the digital content providing server 125 corresponds to an entity which provides electronic publications (e.g., electronic books) to users upon the users' purchase of the items. In this role, the digital content providing server 125 may essentially act as a bookseller or the like. In other cases, the digital content providing server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The digital content providing server 125 may deliver, and the user devices 102, 104 receive, electronic publications (or other media items), search results, upgrades, and/or other information via the network 106. For example, the user devices 102, 104 may download or receive ebooks from the digital content providing server 125. The digital content providing server 125 may also receive various requests (e.g., search queries), instructions and other data from the user devices 102, 104 via the network 106.

Communication between the user devices 102, 104 and the item providing system 120 may be enabled via any communication infrastructure. One example of such an infrastructure includes a combination of a wide area network (WAN) and wireless infrastructure, which allows a user to use the user devices 102, 104 to purchase digital content (e.g., electronic publications) and consume the digital content without being tethered to the digital content providing system 120 via hardwired links. The wireless infrastructure may be provided by one or multiple wireless communications systems, such as wireless communication system 110. In one embodiment, wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 102, 104.

The communication infrastructure may also include a communication-enabling system 115 that serves as an intermediary in passing information between the digital content providing system 120 and the wireless communication system 110. The communication-enabling system 115 may communicate with the wireless communication system 110 (e.g., a wireless carrier) via a dedicated channel, and may communicate with the digital content providing system 120 via a non-dedicated communication mechanism, (e.g., a public Wide Area Network (WAN) such as the Internet).

In addition to wirelessly connecting to wireless communication system 110, user devices 102, 104 may also wirelessly connect to other user devices 102, 104. For example, user device 102 may form a wireless ad hoc (peer-to-peer) network with user device 104 using WiFi, Bluetooth, or other wireless communication protocols.

In one embodiment, user devices 102, 104 each include a proximity detection module 135. Proximity detection module 135 may use information obtained from a plurality of sensors (e.g., a distance detector such as an infrared (IR) sensor, a capacitance sensor, a metal detector) to determine when a user is in proximity to the user device 102, 104. Proximity detection module 135 may determine if an object is within a threshold distance of the user device 102, 104 (or may determine the actual distance that the object is from the device), and may determine if that object has a capacitance value that rises above a presence threshold such that a presence of the object may be detected. In addition, proximity detection module 135 may determine if the detected object is made from metal or some other material. Using these determinations, proximity detection module 135 may signal the user device 102, 104 to take some action, such as reducing the transmission power of the device. Additional details of the proximity detection module 135 are provided below.

Figure 2:
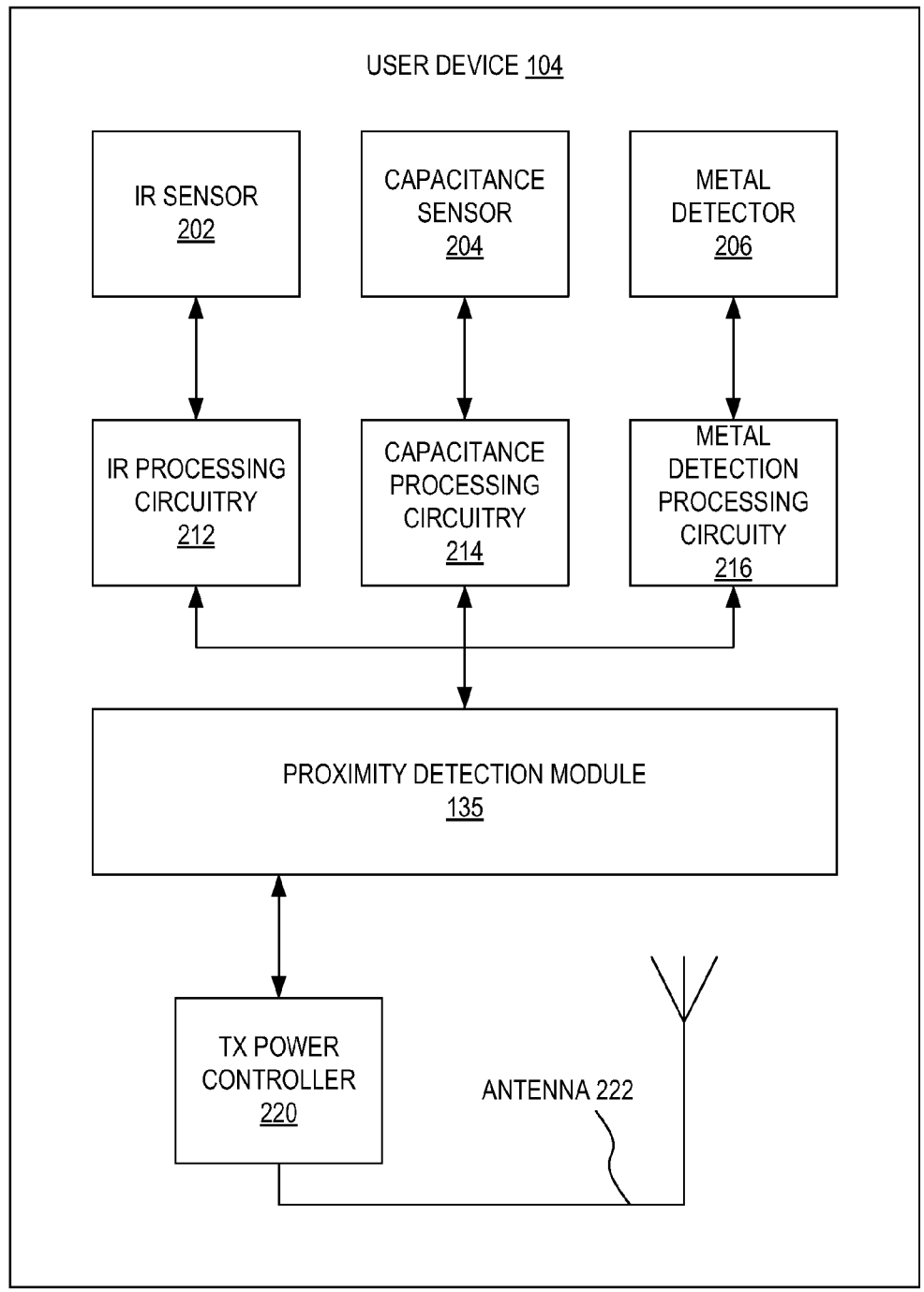
FIG. 2 is a block diagram illustrating a user device for improved proximity detection, according to an embodiment.

FIG. 2 is a block diagram illustrating a user device for improved proximity detection, according to an embodiment. In one embodiment, the user device 104 may correspond to one or all of the user devices 102, 104 of FIG. 1 and may be any type of user device such as an electronic book reader, a PDA, a mobile phone, a laptop computer, a portable media player, a tablet computer, an electronic pad, a desktop computer, a camera, a video camera, a netbook, or the like.

In one embodiment, user device 104 may include a plurality of sensors used for improved proximity detection. The sensor may include distance sensor 102, capacitance sensor 204, and metal detector 206. In other embodiments, user device 104 may include some other combination of these and/or other sensors. Each sensor may be connected to processing circuitry (e.g., distance processing circuitry 212, capacitance processing circuitry 214, and metal detection processing circuitry 216) to process the data received by the sensors and determine a sensor value. In another embodiment, the sensors and processing circuitries may be implemented together in a single component. The sensor values may be provided to proximity detection module 135, which may use the sensor values to make a determination as to the presence of an object and whether or not that object is a user's body. Based on that determination, proximity detection module 135 may take certain actions, such as for example, providing a signal to transmission power controller 220 causing the controller 220 to reduce the transmission power of an antenna 222. In other embodiments, proximity detection module 135 may take some other action (or take no action) based on the presence determination.

Distance sensor 202 may determine an actual distance between an object and user device 104 or may determine whether the object is within a certain distance from user device 104. In one embodiment, distance sensor 202 may be an IR sensor that uses IR light to determine the distance of an object from user device 104. IR sensor 202 may apply a voltage to one or more IR light emitting diodes (LEDs) which emit infrared light. The light propagates through the air and once it hits the object, is reflected back towards the sensor 202. If the object is close to the sensor 202, the reflected light will be stronger than if the object is further away. IR sensor 202 may measure the intensity of the reflection and IR processing circuitry 212 may use the strength of the reflected light to determine how far the object is from user device 104. In another embodiment, IR sensor 202 may measure the amount of time that it takes for the IR light to be reflected back to the sensor and IR processing circuitry 212 may use that time measurement to determine the distance of the object. In other embodiments, distance sensor 202 may be implemented using other sensors besides an IR sensor, such as an audio chirp sensor which measures the reflection of sound waves, a camera which measures visible light, or some other type of sensor.

Capacitance sensor 204 may be used to determine the presence of an object in proximity to user device 104. Capacitance sensor 204, for example, may emit an electric field (E-field) that is disrupted by the presence of an object in proximity to the sensor 204. Capacitance sensor 204 may detect this disruption, or change, in the field and provide an indication of the strength of the field to capacitance processing circuitry 214. In one embodiment, capacitance processing circuitry 214 measures capacitance in terms of raw counts (e.g., the higher the capacitance the higher the raw counts). When a conductive object, such as a user's hand or body, comes in proximity to capacitive sensor 204 the raw counts measured by processing circuitry 214 may increase. Generally, the capacitance sensor 204 may have a baseline count value, when no objects are present. Capacitance processing circuitry 214 may compare the raw counts (representing the capacitance due to the presence of a conductive object, such as user's finger) to the baseline value which represents the absence of a conductive object. Capacitance processing circuitry 214 may thus determine a difference between the measured raw count value and the baseline value. In one embodiment, the baseline may be established immediately after power-on by taking the average count value over a period of time. The baseline may be periodically updated to take into account external changes such as temperature and humidity.

Capacitance processing circuitry 214 may provide an indication of the change in count values to proximity detection module 135. In one embodiment, capacitance sensor 204 may be configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation.

Metal detector 206 may be used to determine if the object identified by IR sensor 202 or capacitance sensor 204 is made of metal. Depending on the distance between the object and user device 104, a metal object (e.g., a table) may be difficult to distinguish from a human body using just IR sensor 202 and capacitance sensor 204. Metal detector 206 can be used to provide confirmation on whether the object is made of metal or not.

In one embodiment, metal detector 206 may include an LC circuit formed from an inductor (L) and a capacitor (C). When connected together (e.g., in parallel) they may act as an electrical resonator storing electrical energy oscillating at the circuit's resonant frequency. The capacitor may store energy in the electric field, while the inductor stores energy in its magnetic field. The energy may oscillate back and forth between the capacitor and inductor at a frequency determined by the capacitance and inductance values used. In one embodiment a metal object (e.g., a ferromagnetic material) placed in proximity to the inductor will increase the inductance value, thereby decreasing the resonant frequency of the LC circuit. Metal detection processing circuitry 216 may monitor the frequency of the LC circuit in metal detector 206, and determine a change between the actual frequency and the resonant frequency of the circuit. Metal detection processing circuitry 216 may provide an indication of this change to proximity detection module 135.

Figure 3:
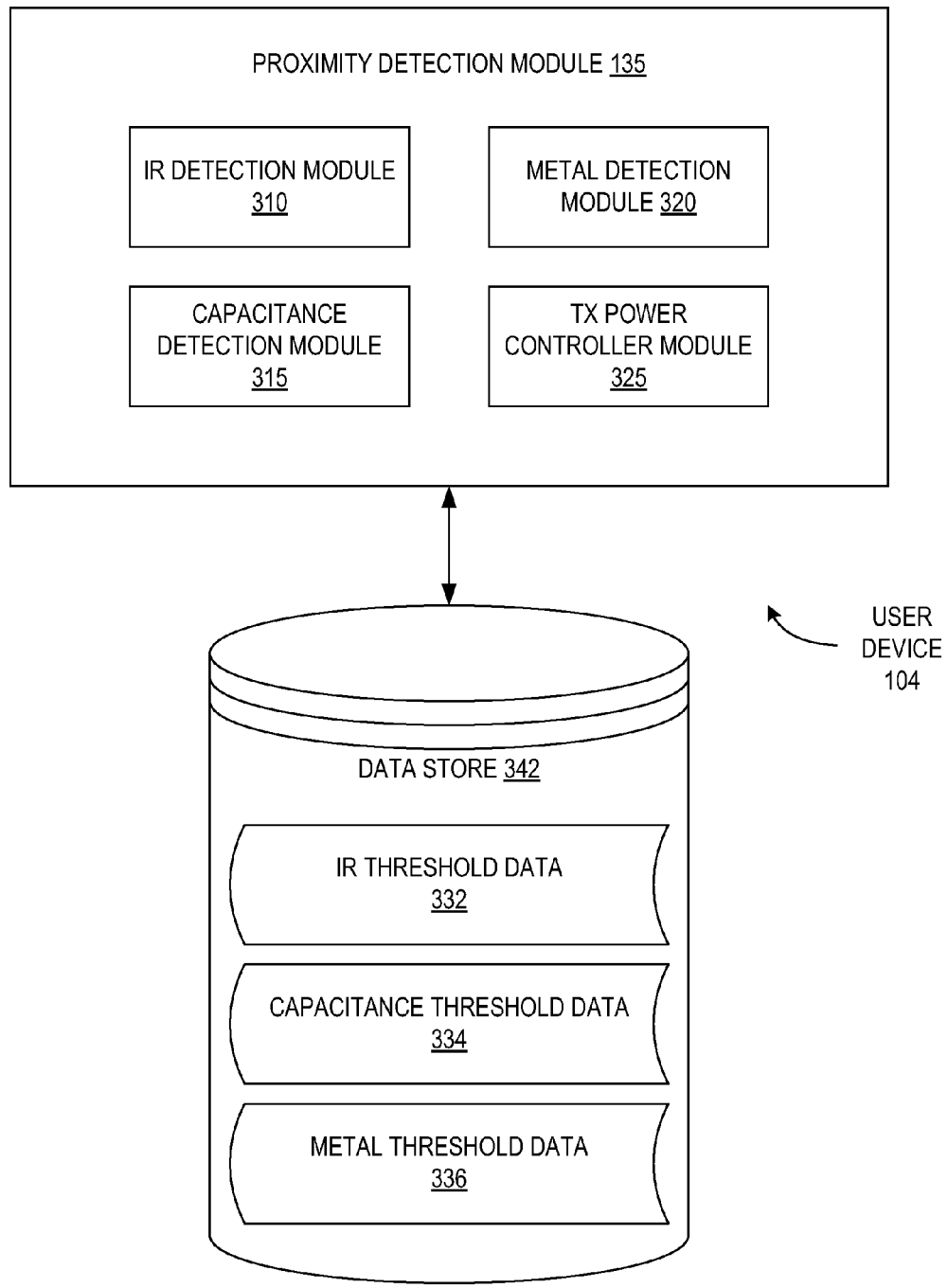
FIG. 3 is a block diagram illustrating a proximity detection module, according to an embodiment.

FIG. 3 is a block diagram of one embodiment of a proximity detection module 135 that is included in a user device 104, which may correspond to proximity detection module 135 of FIG. 1 and FIG. 2. In one embodiment, user device 104 includes proximity detection module 135, which may include distance detection module 310, capacitance detection module 315, metal detection module 320, and transmit power controller module 325. In one embodiment, proximity detection module 135 is connected to a data store 342, which may be a file system, database or other data management layer resident on a data storage device such as a disk drive, RAM, ROM, database, etc.

Distance detection module 310 (also referred to herein as IR detection module 310) may receive the determined distance from distance processing circuitry 212. In one embodiment IR detection module 310 may store the distance value in data store 342 for later use. In another embodiment, IR detection module 310 may compare the received distance value to a distance threshold, stored for example as IR threshold data 332 in data store 342. The distance threshold may represent a certain distance away from user device 104 in which certain objects may be of interest. For example, if the distance of an object from user device 104 exceeds the distance threshold, then proximity detection module 135 may not detect the presence of the object (i.e., capacitance detection module 315 may not examine the capacitance value from capacitance sensor 204). In one embodiment, there may be various distance thresholds that correspond to various distances. In another embodiment, there may be one distance threshold corresponding to a certain distance, which if exceed, indicates that the object is within a certain distance (e.g., 10 mm). IR detection module may also store an indication that the object is within the distance threshold in data store 342.

Capacitance detection module 315 may receive a capacitance value (e.g., a difference in count values) from capacitance processing circuitry 315. In one embodiment, capacitance detection module 315 may also receive the determined distance value from IR detection module 310. Capacitance detection module 315 may read from a table or other data structure in data store 342 that contains an expected capacitance value at various given distances for a human body. If the capacitance value for the given distance matches the expected value, proximity detection module 135 may detect the presence of a user in proximity to user device 104. In one embodiment, the expected values may account for environmental conditions, such as temperature, humidity, etc. User device 104 may additionally include one or more sensors to detect these environmental conditions so that the information can be factored into the presence detection process.

In another embodiment, capacitance detection module 315 may receive an indication from IR detection module 310 as to whether the distance of the object was within the distance threshold. If the object is within the distance threshold, capacitance detection module 315 may compare the capacitance value to a presence threshold for a user's body, stored for example as capacitance threshold data 334 in data store 342. If the capacitance value meets or exceeds the capacitance threshold, proximity detection module 135 may detect the presence of a user in proximity to the user device 104. In one embodiment, capacitance threshold data 334 may include a number of thresholds (e.g., a high presence threshold and a low presence threshold). If the received capacitance value is below the low presence threshold, no presence may be detected. If the received capacitance value is above the high presence threshold, presence may be detected. If the received capacitance value is between the low presence threshold and the high presence threshold, capacitance detection module may take some other action, such as requesting another capacitance value or making a determination based on other factors (e.g., environmental factors).

Metal detection module 320 may receive an indication of the change in frequency of metal detector 206 from metal detection processing circuitry 216. Metal detection module 320 may compare the change in frequency to a metal threshold, stored for example as metal threshold data 336 in data store 342. If the change in frequency exceeds the metal threshold, metal detection module 320 may determine that the object was made of metal. Conversely, if the threshold is not exceeded, metal detection module 320 may determine that the object is not metal (i.e., made of some other material). Metal detection module 320 may store an indication of this determination in data store 342.

In one embodiment, metal detection module 320 may also receive an indication from capacitance detection module 315 indicating whether the capacitance threshold was met. If the capacitance threshold was met, and metal was not detected, proximity detection module 135 may detect the presence of a user in proximity to user device 104. If, however, metal was detected, proximity detection module 135 may not detect the presence of a user in proximity to user device 104.

Transmission power controller module 325 may control signals provided to transmission power controller 220. In one embodiment, if any of IR detection module 310, capacitance detection module 315 and metal detection module 320 detect the presence of a user in proximity to user device 104, transmission power controller module 325 may send a signal causing transmission power controller 220 to reduce the power to antenna 222. If no presence is detected, no signal may be sent to transmission power controller 220 and the transmission power of antenna 222 may be maintained at the current level.

Figure 4:
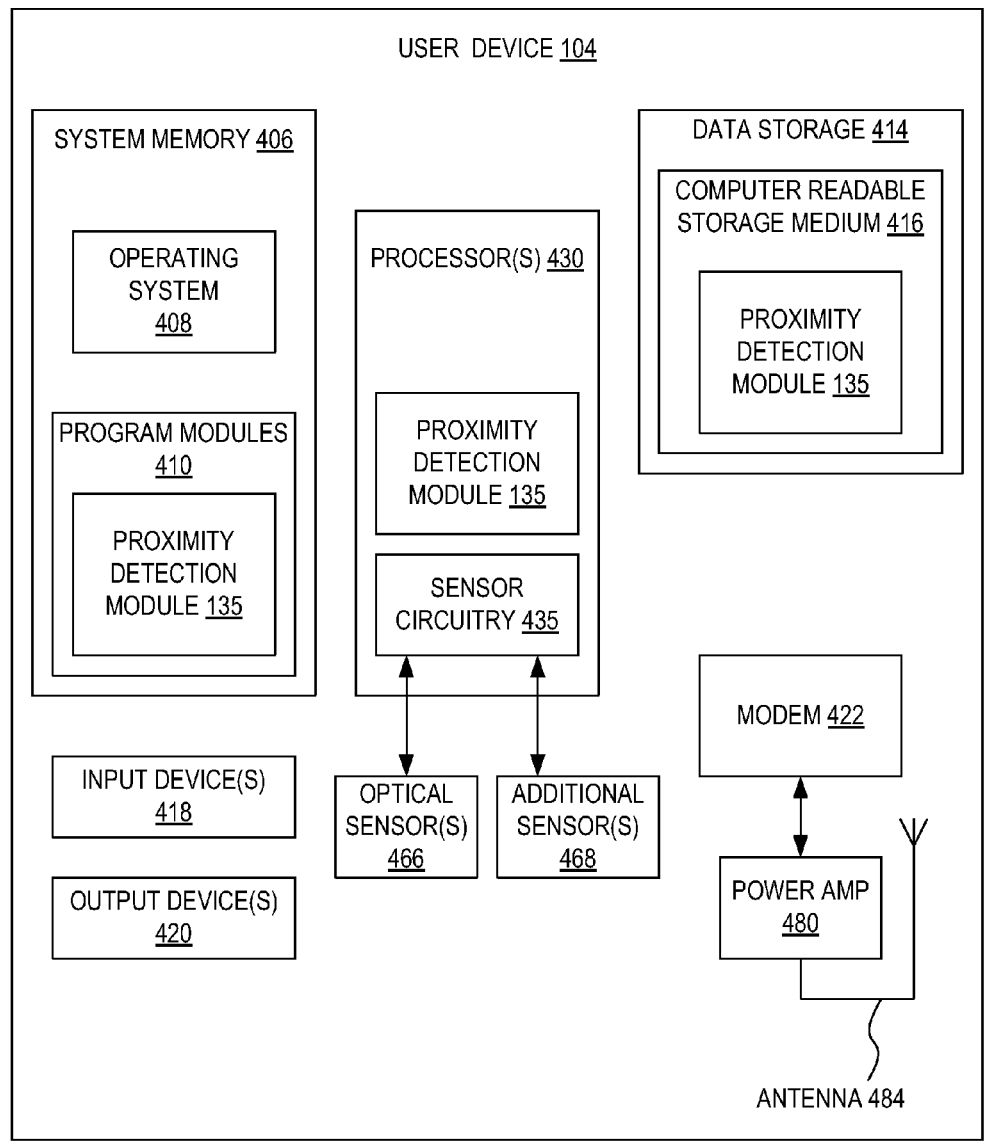
FIG. 4 is a block diagram illustrating an exemplary user device, according to an embodiment.

FIG. 4 is a block diagram illustrating an exemplary user device 104. In one embodiment, the user device 104 may correspond to one or all of the user devices 102, 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 104 includes one or more processors 430, such as one or more CPUs, microcontrollers, field programmable gate arrays, or other types of processors. The user device 104 also includes system memory 406, which may correspond to any combination of volatile and/or non-volatile storage mechanisms. The system memory 406 stores information which provides an operating system component 408, various program modules 410 such as proximity detection module 135, and/or other components. The user device 104 performs functions by using the processor(s) 430 to execute instructions provided by the system memory 406.

The user device 104 also includes a data storage device 414 that may be composed of one or more types of removable storage and/or one or more types of non-removable storage. The data storage device 414 includes a computer-readable storage medium 416 on which is stored one or more sets of instructions embodying any one or more of the methodologies or functions described herein. As shown, instructions for the proximity detection module 135 may reside, completely or at least partially, within the computer readable storage medium 416, system memory 406 and/or within the processor(s) 430 during execution thereof by the user device 104, the system memory 406 and the processor(s) 430 also constituting computer-readable media. In one embodiment, data storage 414 includes data store 342 of FIG. 3. The user device 104 may also include one or more input devices 418 (keyboard, mouse device, specialized selection keys, etc.) and one or more output devices 420 (displays, printers, audio output mechanisms, etc.).

The user device 104 further includes a wireless modem 422 to allow the user device 104 to communicate via a wireless network (e.g., such as provided by the wireless communication system) and/or with other computing devices, such as remote computers, the item providing system, online book stores, electronic catalogs for libraries, and so forth. The wireless modem 422 may allow the user device 104 to handle both voice and non-voice communications (such as communications for text messages, multimedia messages, media downloads, web browsing, etc.) with the wireless communication system 110. The wireless modem 422 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 422 may generate signals and send these signals to power amplifier (amp) 480 for amplification, after which they are wirelessly transmitted via antenna 484. In addition to sending data, antenna 484 also receives data, which is sent to wireless modem 422 and transferred to processor(s) 430.

In one embodiment, user device 104 includes an optical sensor 466. The optical sensor 466 may be a low resolution camera (e.g., having 0.2 or 0.3 Megapixels) that takes images (e.g., of a user's eyes) on a periodic basis. Alternatively, the optical sensor 466 may have a higher resolution, such as 1 Megapixel up to 10 or more Megapixels. The optical sensor 466 may be positioned such that images are taken of a user's face while the user holds the user device 104 in front of his face in a standard reading position. Therefore, the optical sensor 466 may be used to track user eye movement during reading.

In one embodiment, user device 104 includes one or more additional sensors 468 such as a physical contact sensor, close proximity sensors, or motion sensors. The sensors 468 may include, for example, IR sensor 202, capacitance sensor 204, and metal detector 206. The sensors 468 can detect the presence of human body parts, and convey information regarding the detected presence to processor(s) 430. In one embodiment, the sensors 468 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 468 may also be optical (e.g., infrared) sensors that use an emitter and receiver pair to detect the presence of opaque objects. Alternatively, the sensors 468 may be inductive sensors, which include an inductive loop. When the presence of a human body part (or metal object) is brought close to the inductive sensor, an induction of the inductive loop changes, causing the human body part to be detected. Alternatively, the sensors 468 may be ultrasonic sensors that emit an ultrasonic signal and measure a time duration between when a signal is transmitted and the reflection of that signal received (a.k.a., flight response). The sensors 468 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 468 include a motion sensor, such as an accelerometer or one or more gyroscopes. The user device 104 may use motion data from motion sensors to determine whether a user is holding the user device 104. For example, if the user device 104 experiences constant minor accelerations, it may be determined that the user device 104 is being held in a user's hand. Additionally, if the user device 104 is at a particular angle (detectable based on acceleration readings from an accelerometer), it may be determined that the user device 104 is being rested on a user's leg during reading.

The processor(s) 430 may include sensor circuitry 435 (e.g., sensor device drivers) that enables the processor(s) 430 to interpret signals received from the optical sensor(s) 466 and/or additional sensors 468. In one embodiment, the optical sensors 466 and/or additional sensors 468 output raw sensor data. In another embodiment, the optical sensors 466 and/or additional sensors 468 output fully processed signals to the processor(s) 430. For example, the additional sensors 468 may output a user contact/no user contact signal using a single line interface or a multi-line interface. In another embodiment, the additional sensors 468 output, for example, positional data and/or object presence data (e.g., of a human body part) to the processors 430 without first processing the data. In either instance, the processors 430 may use the sensor circuitry 435 to process and/or interpret the received data. If data is received from multiple sensors, processing the data may include averaging the data, identifying a maximum from the data, or otherwise combining the data from the multiple sensors.

Figure 5:
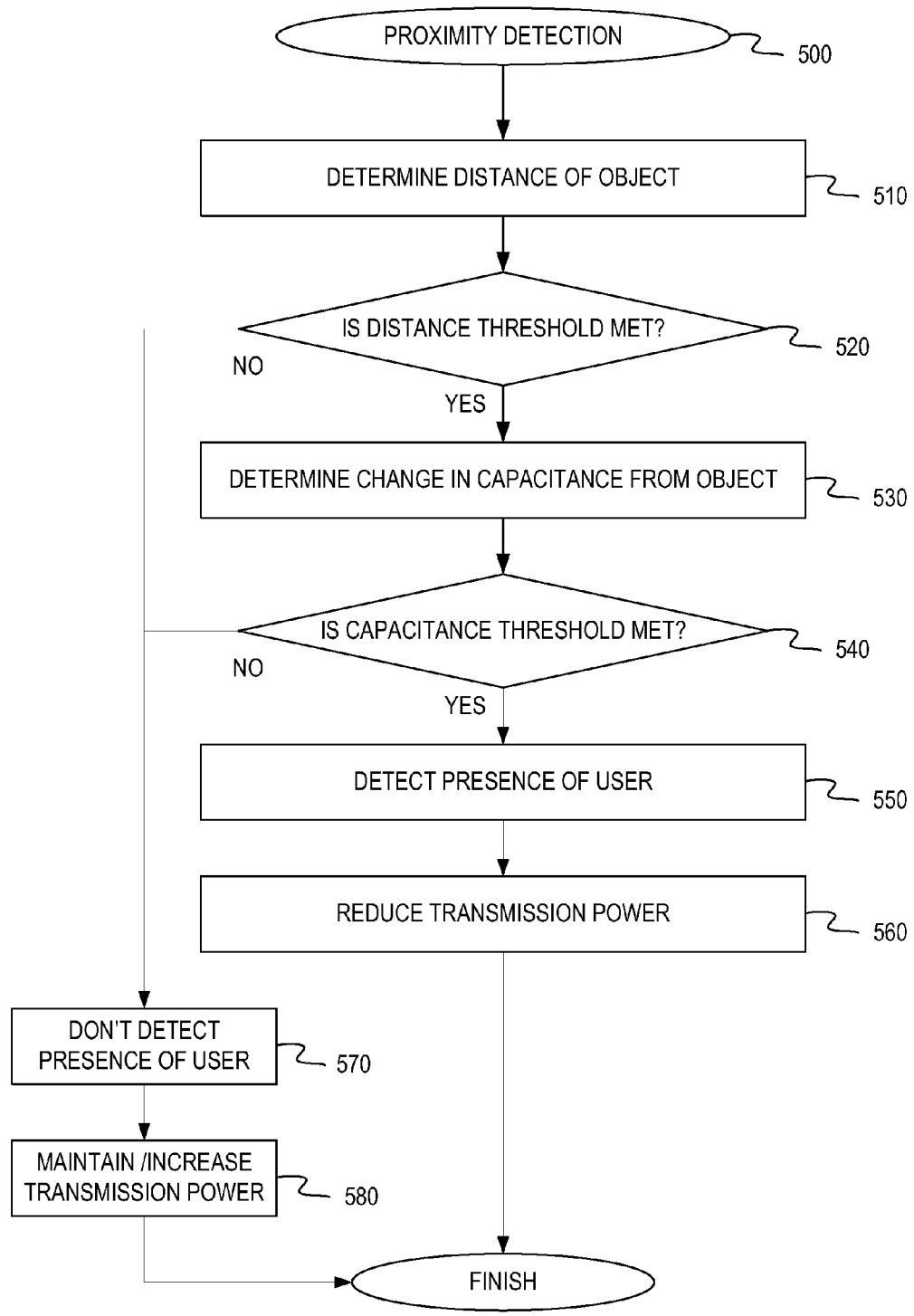
FIG. 5 is a flow diagram illustrating an improved proximity detection method, according to an embodiment.

FIG. 5 is a flow diagram illustrating a dynamic biography availability method, according to an embodiment of the present invention. The method 500 may be performed by processing logic that comprises hardware (e.g., circuitry, dedicated logic, programmable logic, microcode, etc.), software (e.g., instructions run on a processor to perform hardware simulation), or a combination thereof. The processing logic is configured to detect the presence of a user in proximity to a user device. In one embodiment, method 500 may be performed by proximity detection module 135, as shown in FIG. 3.

Referring to FIG. 5, at block 510, method 500 determines the distance of an object from the user device 104. As described above, IR detection module 310 may receive an indication of the distance between the object and user device 104 from IR sensor processing circuitry 212 based on measurements from IR sensor 202. At block 520, method 500 determines if a distance threshold is met. IR detection module 310 may compare the received distance value to a distance threshold, stored as IR threshold data 332 in data store 342. If the distance is within the threshold (i.e., the object is closer to the user device 104 than the distance indicated by the distance threshold), method 500 may proceed to block 530.

At block 530, method 500 determines the change in capacitance attributed to an object near user device 104. As described above, capacitance detection module 315 may receive an indication of the change in capacitance from capacitance sensor processing circuitry 214 based on measurements from capacitance sensor 204. At block 540, method 500 determines if a capacitance threshold is met. Capacitance detection module 315 may compare the received capacitance value to a presence threshold for a user, stored as capacitance threshold data 334 in data store 342. If the capacitance value exceeds the presence threshold, method 500 may proceed to block 550.

At block 550, method 500 may detect the presence of a user in proximity to the user device 104. This detection may occur as a result of an object having a sufficiently large capacitance value (i.e., exceeding the presence threshold) and being sufficiently close to the user device 104 (i.e., within the distance threshold). As a result of this detection, at block 560, method 500 may perform an action such as reducing the transmission power of a radio-frequency antenna 222 in user device 104. Transmission power controller module 325 may send a signal to transmission power controller 220 causing the controller 220 to reduce the power of antenna 222. The reduced power when a user is in proximity to user device 104 may prevent the user from being exposed to excess radiation. In other embodiments, some other action may be performed.

If at block 520, method 500 determines that the distance threshold is not met, or at block 540, method 500 determines that the capacitance threshold is not met, method 500 may proceed to block 570. At block 570, method 500 does not detect the presence of a user in proximity to user device 104 because either the object is too far away from user device 104 or the object does not have the same capacitance values as a human body. At block 580, method 500 may maintain or increase the current transmission power of antenna 222. For example, in one embodiment, if the user device determines that a user is not in proximity to the device, the device may increase the transmission power of antenna 222 to provided improved performance.

Figure 6:
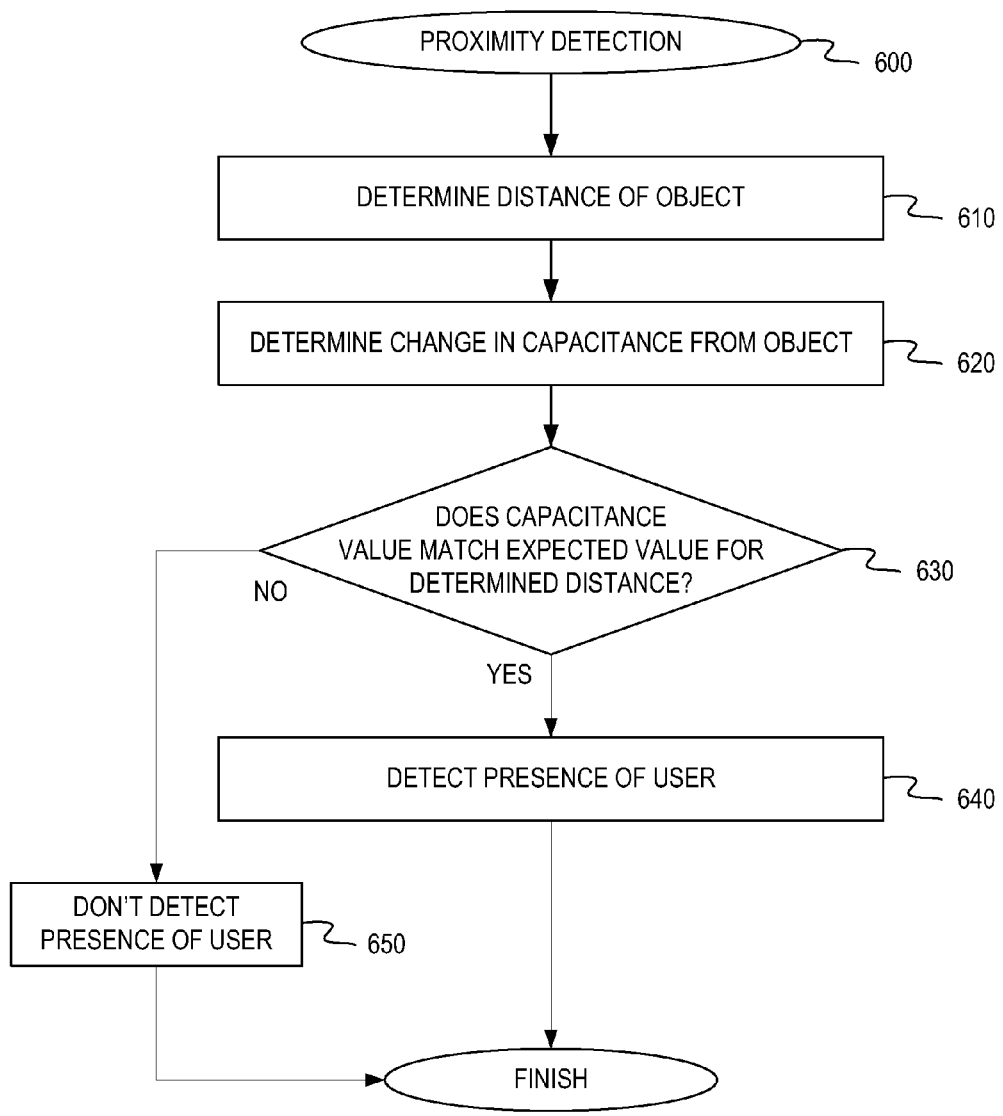
FIG. 6 is a flow diagram illustrating an improved proximity detection method, according to another embodiment.

FIG. 6 is a flow diagram illustrating a proximity detection method, according to an embodiment of the present invention. The method 600 may be performed by processing logic that comprises hardware (e.g., circuitry, dedicated logic, programmable logic, microcode, etc.), software (e.g., instructions run on a processor to perform hardware simulation), or a combination thereof. The processing logic is configured to detect the presence of a user in proximity to a user device. In one embodiment, method 600 may be performed by proximity detection module 135, as shown in FIG. 3.

Referring to FIG. 6, at block 610, method 600 determines the distance of an object from the user device 104. As described above, IR detection module 310 may receive an indication of the distance between the object and user device 104 from IR sensor processing circuitry 212 based on measurements from IR sensor 202. At block 620, method 600 determines the change in capacitance attributed to an object near user device 104. As described above, capacitance detection module 315 may receive an indication of the change in capacitance from capacitance sensor processing circuitry 214 based on measurements from capacitance sensor 204.

At block 630, method 600 determines if the capacitance value matches an expected value for a human body at the determined distance. In one embodiment, data store 342 may contain a data structure including a number of expected capacitance values for a human body at different distances. Capacitance detection module 315 may identify an expected value for the distance determined at block 610 and compare the capacitance value determined at block 620 to that expected value. If the capacitance value matches the expected value, or is sufficiently close (i.e., within a predefined threshold), at block 640, method 600 may detect the presence of a user in proximity to user device 104. If at block 630, method 600 determines that the capacitance value does not match the expected value, at block 650, method 600 does not detect the presence of a user. As discussed above, appropriate action may be taken based on the result of this determination.

Figure 7:
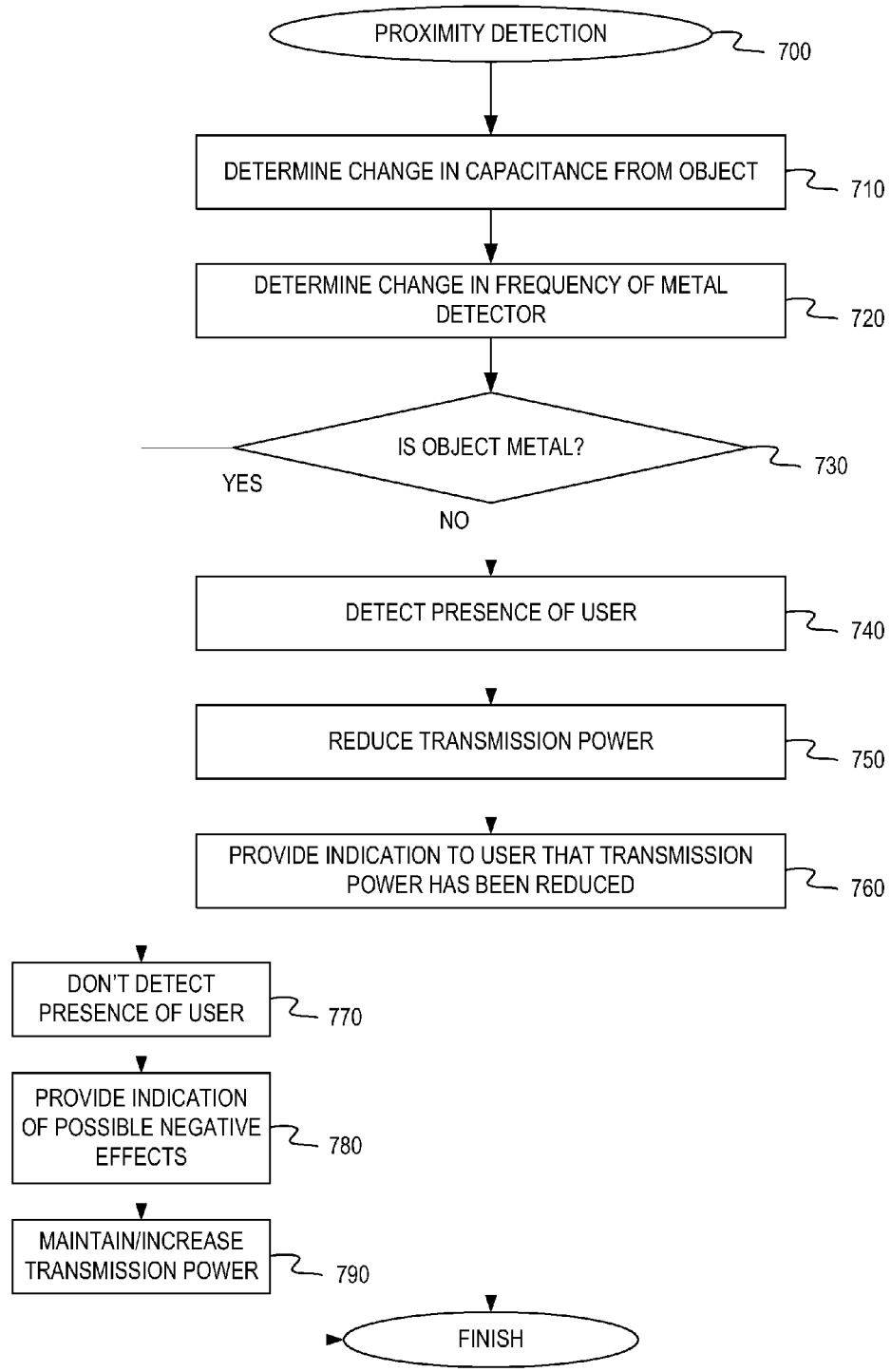
FIG. 7 is a flow diagram illustrating an improved proximity detection method, according to an embodiment.

FIG. 7 is a flow diagram illustrating a proximity detection method, according to an embodiment of the present invention. The method 700 may be performed by processing logic that comprises hardware (e.g., circuitry, dedicated logic, programmable logic, microcode, etc.), software (e.g., instructions run on a processor to perform hardware simulation), or a combination thereof. The processing logic is configured to detect the presence of a user in proximity to a user device. In one embodiment, method 700 may be performed by proximity detection module 135, as shown in FIG. 3.

Referring to FIG. 7, at block 710, method 700 determines the change in capacitance attributed to an object near user device 104. As described above, capacitance detection module 315 may receive an indication of the change in capacitance from capacitance sensor processing circuitry 214 based on measurements from capacitance sensor 204. At block 720, method 700 determines a change in frequency of the metal detector 206. As described above, metal detection module 320 may receive an indication of the change in frequency from metal detection processing circuitry 216 based on measurements from metal detector 206.

At block 730, method 700 determines if the object is metal. Metal detection module 320 may compare the received frequency value to a metal threshold, stored as metal threshold data 336 in data store 342. If the frequency value does not exceed the metal threshold, at block 640, method 600 may determine that the object is not metal and detect the presence of a user in proximity to user device 104. Thus, the object has a sufficiently large capacitance value (i.e., at least the capacitance value of a human body) and is not made of metal. Therefore, the assumption is that the object is a human body. As a result of this detection, at block 750, method 700 may perform an action such as reducing the transmission power of a radio-frequency antenna 222 in user device 104. In other embodiments, some other action may be performed. At block 760, method 700 may provide an indication (e.g., to a user or to another application) that the transmission power of the antenna 222 has been reduced.

If at block 730, method 700 determines that the frequency exceeds the metal threshold, at block 770, method 700 may determine that the object is made of metal and does not detect the presence of a user. At block 780, method 700 may provide an indication (e.g., to a user or to another application) of possible negative effects on performance of the user device due to the presence of the metal object in proximity to the user device. For example, proximity to a large metal object may cause a decrease in the ability of the user device to send and receive data over a wireless network. As a result, at block 790, method 700 may maintain or increase the current transmission power of antenna 222.

Figure 8:
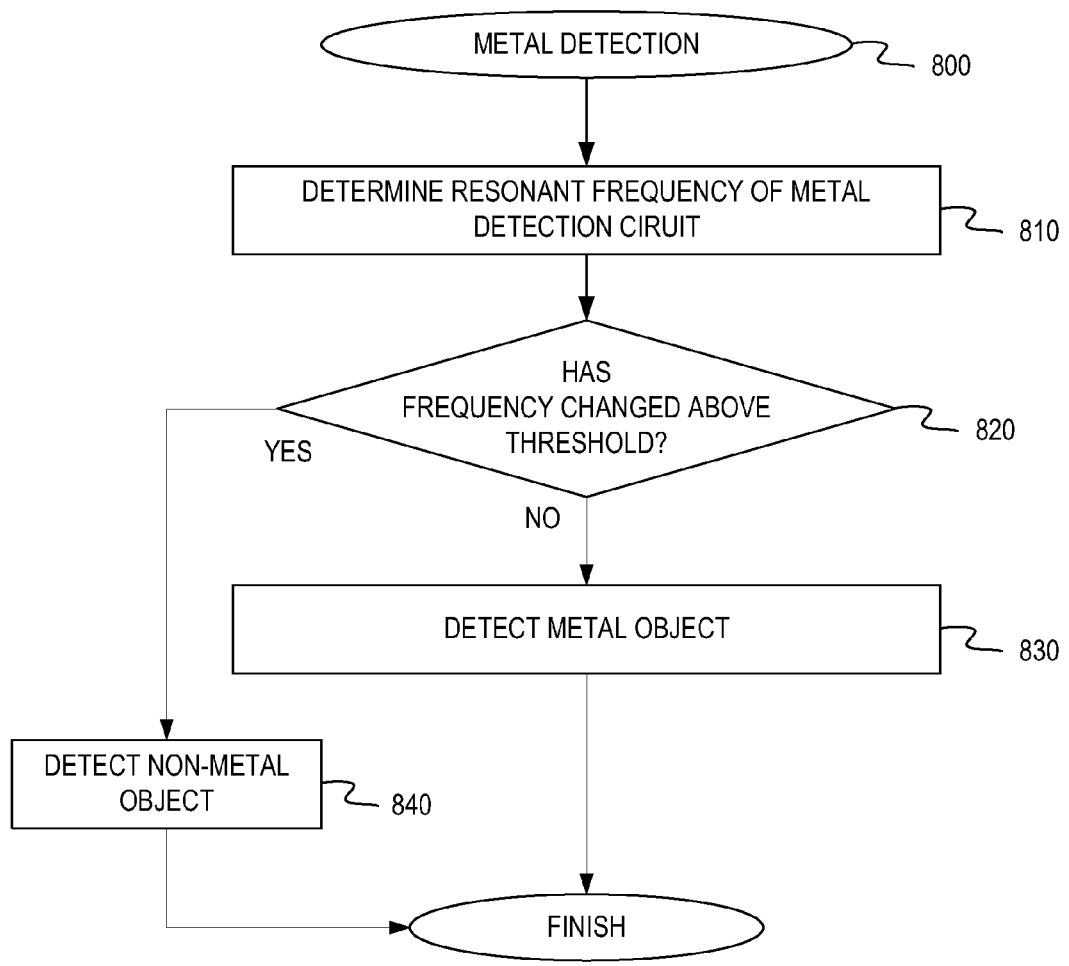
FIG. 8 is a flow diagram illustrating a metal detection method, according to an embodiment.

FIG. 8 is a flow diagram illustrating a metal method, according to an embodiment of the present invention. The method 800 may be performed by processing logic that comprises hardware (e.g., circuitry, dedicated logic, programmable logic, microcode, etc.), software (e.g., instructions run on a processor to perform hardware simulation), or a combination thereof. The processing logic is configured to determine whether a detected object is made of metal. In one embodiment, method 800 may be performed by proximity detection module 135, as shown in FIG. 3.

Referring to FIG. 8, at block 810, method 800 determines the resonant frequency of the metal detection circuit in metal detector 206. As described above, metal detector 206 may include an LC circuit that oscillates at a resonant frequency based on the size of the inductance and capacitance. In one embodiment, metal detector processing circuitry 216 may measure the resonant frequency of the metal detector when no metal object is present. Metal detector processing circuitry 216 may store this value in a data store 342.

At block 820, method 800 determines if the frequency of metal detector 206 has changed above a metal threshold. Metal detection processing circuitry 216 may also measure a current frequency of the metal detector 206 when an object is near the metal detector 206, and determine a change in the frequency. Metal detection module 320 in proximity detection module 135 may compare the change in frequency to a metal threshold, stored as metal threshold data 336 in data store 342. If the change in frequency exceeds the metal threshold, at block 830, method 800 may detect that the object in proximity to user device 104 is made of metal. If the change in frequency does not exceed the metal threshold, at block 840, method 800 may detect that the object is not made of metal. This determination may be used by proximity detection module 135 to detect the presence of a user in proximity to user device 104, as discussed above.

Figure 9:
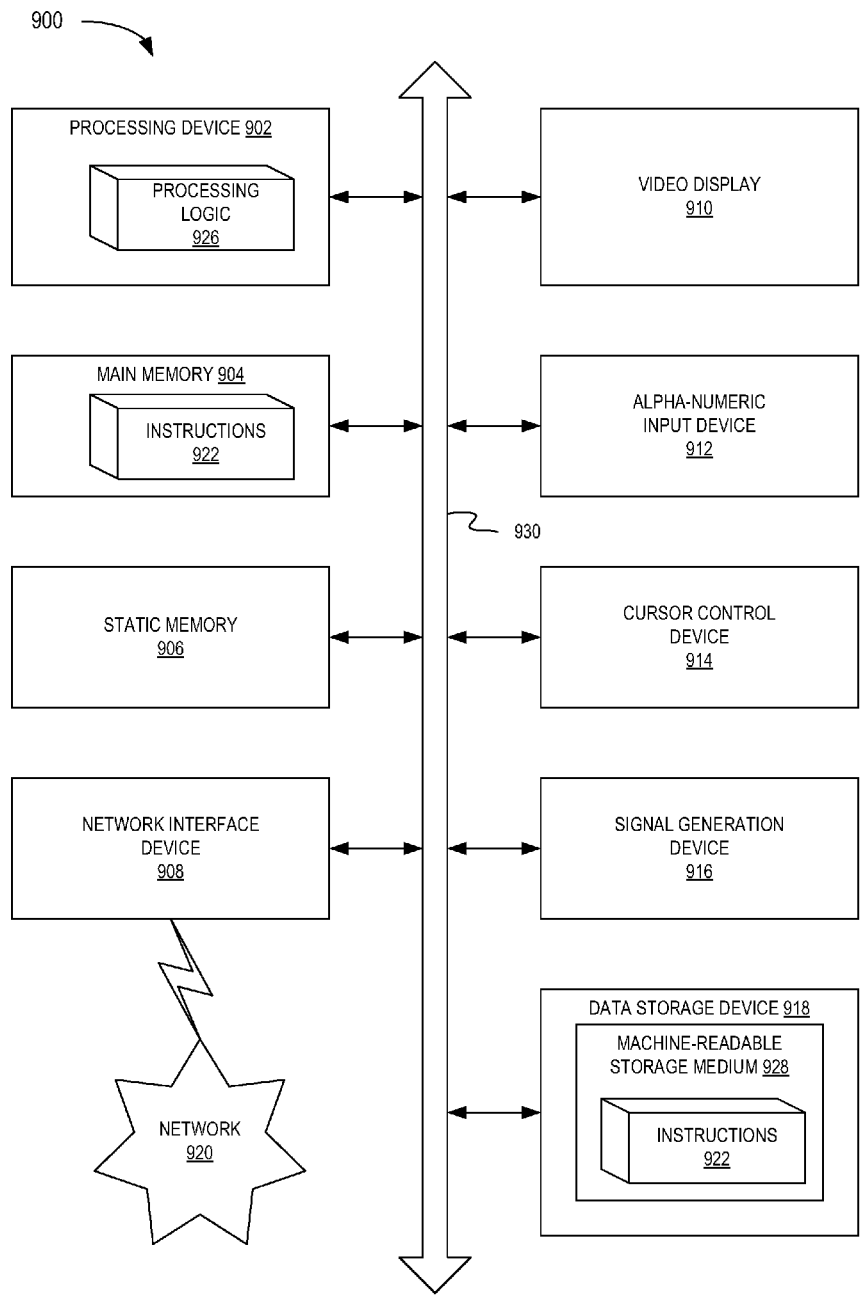
FIG. 9 is a block diagram illustrating one embodiment of a computer system, according to an embodiment.

FIG. 9 illustrates a diagrammatic representation of a machine in the exemplary form of a computer system 900 within which a set of instructions, for causing the machine to perform any one or more of the methodologies discussed herein, may be executed. The system 900 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 900 may represent user device 104 or digital content providing server 125 of FIG. 1.

The exemplary computer system 900 includes a processing system (processor) 902, a main memory 904 (e.g., read-only memory (ROM), flash memory, dynamic random access memory (DRAM) such as synchronous DRAM (SDRAM)), a static memory 906 (e.g., flash memory, static random access memory (SRAM)), and a data storage device 918, which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute the proximity detection module 135 for performing the operations and steps discussed herein.

The computer system 900 may further include a network interface device 908. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 916 (e.g., a speaker).

The data storage device 918 may include a computer-readable medium 928 on which is stored one or more sets of instructions 922 (e.g., instructions of popularity prediction module 127) embodying any one or more of the methodologies or functions described herein. The instructions 922 may also reside, completely or at least partially, within the main memory 904 and/or within processing logic 926 of the processor 902 during execution thereof by the computer system 900, the main memory 904 and the processor 902 also constituting computer-readable media. The instructions may further be transmitted or received over a network 920 via the network interface device 908.

While the computer-readable storage medium 928 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    determining, using an infrared (IR) sensor of a user device, a distance between an object and the user device;
    comparing the distance to a distance threshold;
    determining that the distance is below the distance threshold;
    determining, using a capacitance sensor of the user device, a capacitance value associated with the object;
    comparing the capacitance value to a presence threshold;
    determining that the capacitance value meets or exceeds the presence threshold;
    determining, using a metal detection circuit, whether the object comprises a metal object or whether the object does not comprise a metal object; and
    in response to the object not comprising a metal object, determining, by a processing device, that the object comprises a body part of a user.

2. The method of claim 1, wherein the distance threshold is ten millimeters.

3. The method of claim 1, wherein the capacitance value comprises a difference between a measured capacitance value and a baseline value of the capacitance sensor.

4. The method of claim 1, further comprising:
    in response to the capacitance value not meeting or exceeding the presence threshold, maintaining a current transmission power of the user device.

5. The method of claim 1, further comprising:
    in response to the object not comprising a metal object, reducing a transmission power of the user device.

6. The method of claim 1, further comprising:
in response to the object comprising a metal object, determining that the user is not in proximity to the user device.

7. A non-transitory computer-readable storage medium storing instructions which, when executed, cause a processing device to perform operations comprising:
determining a distance between an object and a user device;
comparing the distance to a distance threshold;
determining a capacitance value of the object;
comparing the capacitance value to a presence threshold for the body part;
determining, using a metal detection circuit, whether the object comprises a metal object or whether the object does not comprise a metal object; and
in response to the distance being below the distance threshold, the capacitance value meeting or exceeding the presence threshold, and the object not comprising a metal object, determining that the object comprises the body part of the user.

8. The non-transitory computer-readable storage medium of claim 7, wherein determining if the object comprises a body part of the user comprises comparing the capacitance value to an expected capacitance value for the body part at the distance.

9. The non-transitory computer-readable storage medium of claim 7, wherein the capacitance value comprises a difference between a measured capacitance value and a baseline value of a capacitance sensor.

10. The non-transitory computer-readable storage medium of claim 7, wherein the operations further comprise:
determining if the object comprises a metal object.

11. The non-transitory computer-readable storage medium of claim 10, wherein determining if the object comprises a metal object comprises:
determining a resonant frequency of a metal detection circuit;
comparing a change in the resonant frequency of the metal detection circuit to a metal threshold; and
in response to the change in the resonant frequency meeting or exceeding the metal threshold, determining that the object comprises a metal object.

12. The non-transitory computer-readable storage medium of claim 10, wherein the operations further comprise:
in response to the object not comprising a metal object, reducing a transmission power of the user device.

13. The non-transitory computer-readable storage medium of claim 10, wherein the operations further comprise:
in response to the object comprising a metal object, maintaining a current transmission power of the user device.

14. A user device, comprising:
a processor;
a distance sensor;
a capacitance sensor;
a metal detection circuit; and
a memory operatively coupled to the processor, the memory storing a proximity detection module, executable by the processor and the memory, the proximity detection module configured to:
determine a distance between an object and a user device;
compare the distance to a distance threshold;
determine a capacitance value of the object;
compare the capacitance value to a presence threshold for the body part;
determine, using the metal detection circuit, whether the object comprises a metal object or whether the object does not comprise a metal object; and
in response to the distance being below the distance threshold, the capacitance value meeting or exceeding the presence threshold, and the object not comprising a metal object, determine that the object comprises the body part of the user.

15. The user device of claim 14, wherein determining if the object comprises a body part of the user comprises comparing the capacitance value to an expected capacitance value for the body part at the distance.

16. The user device of claim 14, wherein the capacitance value comprises a difference between a measured capacitance value and a baseline value of a capacitance sensor.

17. The user device of claim 14, wherein the proximity detection module is further configured to:
in response to the object not comprising a metal object, reduce a transmission power of the user device.

18. The user device of claim 14, wherein the proximity detection module is further configured to:
in response to the object comprising a metal object, maintain a current transmission power of the user device.

19. A method comprising:
detecting, by a processing device, a presence of an object in proximity to a user device;
compare a distance between the object and the user device to a distance threshold;
comparing a capacitance value of the object to a presence threshold;
determining, by the processing device using a metal detection circuit, whether the object comprises a metal object or whether the object does not comprise a metal object; and
in response to the distance being below the distance threshold, the capacitance value meeting or exceeding the presence threshold, and the object not comprising a metal object, determining that the object comprises the body part of the user.

20. The method of claim 19, wherein detecting the presence of the object comprises:
determining if the capacitance value meets or exceeds the presence threshold.

21. The method of claim 19, wherein determining whether the object comprises a metal object comprises:
determining a resonant frequency of a metal detection circuit;
comparing a change in the resonant frequency of the metal detection circuit to a metal threshold; and
in response to the change in the resonant frequency meeting or exceeding the metal threshold, determining that the object comprises a metal object.

22. The method of claim 21, further comprising:
maintaining a current transmission power of the user device.

23. The method of claim 21, further comprising:
in response to the change in the resonant frequency not meeting or exceeding the metal threshold, determining that the object does not comprise a mental object; and
reducing a transmission power of the user device.

* * * * *